United States Patent
Zhi et al.

(10) Patent No.: US 11,063,309 B2
(45) Date of Patent: Jul. 13, 2021

(54) LOW TEMPERATURE OPERABLE ELECTRICAL ENERGY SUPPLY DEVICE

(71) Applicant: City University of Hong Kong, Kowloon (HK)

(72) Inventors: Chunyi Zhi, Shatin (HK); Funian Mo, Kowloon (HK); Zijie Tang, Kowloon (HK); Hongfei Li, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/223,246

(22) Filed: Dec. 18, 2018

(65) Prior Publication Data
US 2020/0194850 A1  Jun. 18, 2020

(51) Int. Cl.
| | |
|---|---|
| *H01M 10/613* | (2014.01) |
| *H01M 10/04* | (2006.01) |
| *H01M 4/137* | (2010.01) |
| *H01M 4/505* | (2010.01) |
| *H01M 4/24* | (2006.01) |

(52) U.S. Cl.
CPC ......... *H01M 10/613* (2015.04); *H01M 4/137* (2013.01); *H01M 4/244* (2013.01); *H01M 4/505* (2013.01); *H01M 10/049* (2013.01)

(58) Field of Classification Search
CPC .... H01M 10/613; H01M 4/505; H01M 4/244; H01M 4/137; H01M 10/049
See application file for complete search history.

(56) References Cited

U.S. PATENT DOCUMENTS

| | | | | |
|---|---|---|---|---|
| 7,820,328 B1 * | 10/2010 | Takeuchi | ............. | C08J 9/26 |
| | | | | 264/45.1 |
| 2010/0040956 A1 * | 2/2010 | Park | ............. | H01M 10/0525 |
| | | | | 429/342 |
| 2011/0294003 A1 * | 12/2011 | Zhang | ............. | C07C 43/23 |
| | | | | 429/199 |

FOREIGN PATENT DOCUMENTS

WO  WO-2018/165585  * 9/2018 .......... H01M 10/052

OTHER PUBLICATIONS

H. Gao, et al, "Adaptive and freeze-tolerant heteronetwork organohydrogels with enhanced mechanical stability over a wide temperature range", Nature communications, 2017, 8, 15911.
D. W. McOwen, et al, "Concentrated electrolytes: decrypting electrolyte properties and reassessing Al corrosion mechanisms", Energy & Environmental Science, 2014. 7, 416.
Y. You, et al, "Subzero-Temperature Cathode for a Sodium-Ion Battery", Advanced Materials. 2016, 28, 7243.
X. Zang, et al, "Flexible, temperature-tolerant supercapacitor based on hybrid carbon film electrodes", Nano Energy, 2017, 40, 224.
W. P. Williams, et al, "The effects of glycerol on the phase behaviour of hydrated distearoylphosphatidylethanolamine and its possible relation to the mode of action of cryoprotectants", Biophysica Acta (BBA)—Biomembranes, 1991, 1062, 123.

(Continued)

*Primary Examiner* — Cynthia K Walls
(74) *Attorney, Agent, or Firm* — Renner Kenner Greive Bobak Taylor & Weber

(57) ABSTRACT

A system and a method for an electrical energy supply device including an anode; a cathode; an electrolyte disposed between the anode and the cathode; the electrical energy supply device is freeze resistant such that the electrical energy supply device can operate at a temperature below 0° C. without deterioration in electrical properties or electrical performance.

35 Claims, 12 Drawing Sheets

(56) References Cited

OTHER PUBLICATIONS

S. Peyghambarzadeh, et al, "Experimental study of heat transfer enhancement using water I ethylene glycol based nanofluids as a new coolant for car radiators", International Communications in Heat and Mass Transfer, 2011, 38, 1283.
R. M. Kumar, el al, "On the Perturbation of the H-Bonding Interaction in Ethylene Glycol Clusters upon Hydration", The Journal of Physical Chemistry A, 2012, 116, 4239.
H. Pan, et al, "Reversible aqueous zinc I manganese oxide energy storage from conversion reactions", Nature Energy, 2016, 1, 16039.
B. Lee, et al, "Electrochemically-induced reversible transition from the tunneled to layered polymorphs of manganese dioxide", Scientific reports, 2014, 4, 6066.

* cited by examiner

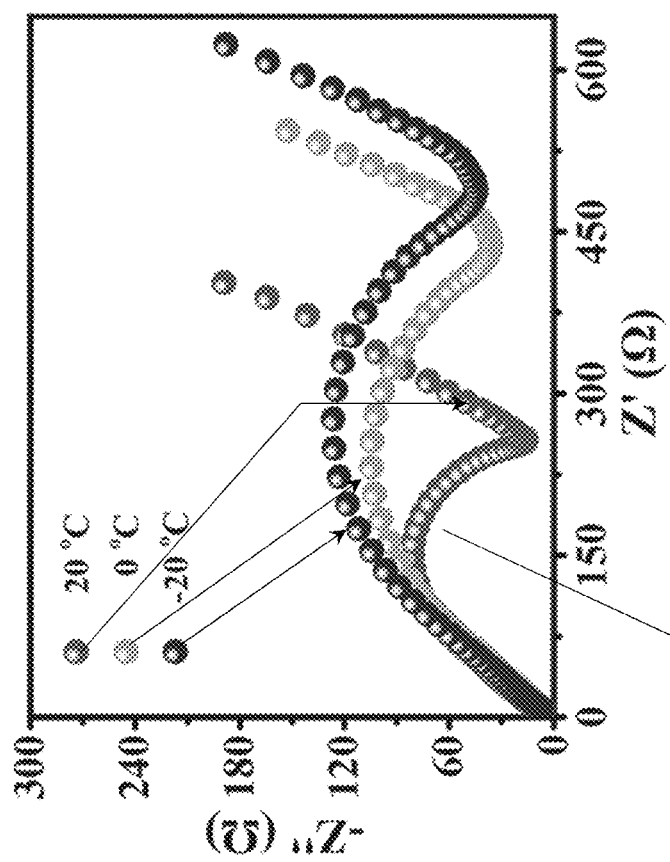
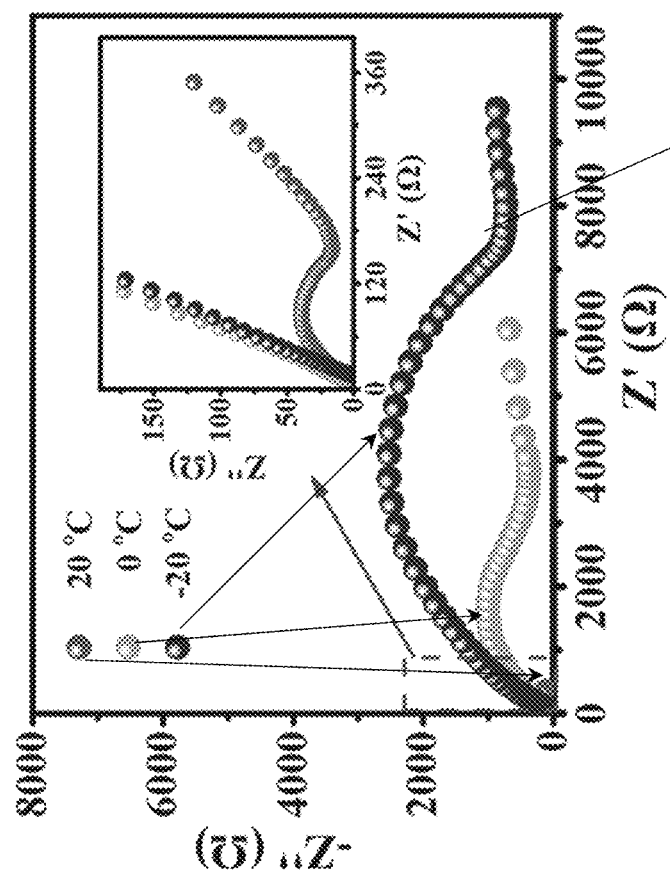

LOW TEMPERATURE OPERABLE ELECTRICAL ENERGY SUPPLY DEVICE

TECHNICAL FIELD

The present disclosure relates to a low temperature operable electrical energy supply device. In particular, but not limited to, the present disclosure is related to a freeze resistant electrical energy supply device that is operable at low temperatures.

BACKGROUND

Electrical energy supply devices have been commonplace in a number of industries and products with increasing use of electronics within technologies and products. Electrical energy supply devices provide a power source to various electronics. A stable power source is a requirement for use in devices and technologies that incorporate electronics. Some example electrical energy supply devices that are commonly used are batteries (i.e. cells) or capacitors or supercapacitors.

Flexible and wearable devices are growing in use and are starting become more mainstream. Flexible and wearable devices are being incorporated into wearable products that are also starting to become more popular and are starting to gain wider usage. A wearable energy source (i.e. a wearable energy device) is a requirement for any wearable device. Wearable energy source devices have attracted tremendous attention due to the rapid development of wearable electronics. Performance of flexible and wearable energy sources can deteriorate in low temperatures.

SUMMARY OF THE INVENTION

It is an advantage of example embodiments of the present invention to provide an electrical energy supply device that is operable at low temperatures, or at least provide the public with a useful alternative.

The electrical energy supply device is a freeze resistant device i.e. a device with a lower freezing point that standard electrical energy supply devices comprising an aqueous electrolyte. The present disclosure relates to an electrical energy supply device that comprises a freeze tolerant i.e. freeze resistant electrolyte, that still retains performance and elasticity at low temperatures.

Other objects of the invention (or inventions) may become apparent from the following description and drawings, which is given by way of example only.

The present disclosure generally relates to an electrical energy supply device, such as for example a battery, that is operable at low temperatures. In one example embodiment the electrical energy supply device comprises an anode, a cathode and an electrolyte that is freeze resistant. The electrical energy supply device is operable at low temperatures e.g. at below −10° C. The electrical energy storage device retains its mechanical properties e.g. elastically deformable at temperatures below −10° C. In one example the electrical energy supply device is operable up to −20° C.

In accordance with a first aspect the present invention relates to an electrical energy supply device comprising:
   an anode;
   a cathode;
   an electrolyte disposed between the anode and the cathode;
   the electrical energy supply device is freeze resistant such that the electrical energy supply device can operate at a temperature below 0° C. without deterioration in electrical properties or electrical performance.

In an embodiment the electrical energy supply device is configured to operate at temperatures between 0° C. to −20° C. without deterioration in electrical properties or electrical performance.

In an embodiment the electrical energy supply device is configured to operate at temperatures between −10° C. to −20° C. without deterioration in electrical properties or electrical performance.

In an embodiment the electrical energy supply device maintains mechanical properties at temperatures between 0° C. to −20° C.

In an embodiment the electrical energy storage device maintains its elasticity at temperatures between 0° C. to −20° C., such that the electrical energy storage device can elastically deform.

In an embodiment the electrical energy storage device is configured to deform in response to a force and recover to an original configuration once the force is removed, at temperatures between 0° C. to −20° C.

In an embodiment the anode comprises zinc or a zinc compound.

In an embodiment the anode comprises zinc film disposed on a nickel or copper or nickel-copper alloy cloth.

In an embodiment the cathode comprises Manganese dioxide.

In an embodiment the cathode comprises manganese dioxide nanorods disposed in situ among carbon nanotubes.

In an embodiment the cathode comprises a paste comprising the manganese dioxide nanorods and the carbon nanotubes.

In an embodiment the electrolyte is a freeze resistant hydrogel electrolyte such that the freezing point of the electrolyte is below −20° C.

In an embodiment the electrolyte comprises glycol compounds.

In an embodiment the electrolyte comprises ethylene glycol polyurethane acrylate.

In an embodiment the electrolyte comprises ethylene glycol waterborne anionic polyurethane acrylate, the electrolyte further comprises a polyacrylamide hydrogel and wherein the ethylene glycol anionic polyurethane acrylate crosslink the polyacrylamide.

In an embodiment the electrolyte comprises at least 20% weight percentage of ethylene glycol polyurethane acrylate.

In an embodiment the electrolyte comprises at least 24% weight percentage of ethylene glycol polyurethane acrylate within the electrolyte.

In an embodiment the electrical energy supply device maintains at least 80% specific capacity with Coulombic efficiency is greater than 90% at temperatures below 0° C.

In an embodiment the anode, cathode and electrolyte are formed as a multi-layer laminate structure.

In an embodiment the manganese dioxide nanorods comprise a diameter between 20 nm and 40 nm.

In accordance with another aspect the present invention relates to an electrical energy supply device comprising;
   a multi-layer laminate structure, the multi-layer laminate structure including;
   an anode including a first substrate and a metal layer disposed on the first substrate,
   a cathode including a second substrate and a cathode material layer disposed on the second substrate, an ethylene glycol waterborne anionic polyurethane acrylate and polyacrylamide hydrogel electrolyte, wherein the hydrogel electrolyte resists freezing up to a temperature of −20° C., and;

wherein the electrolyte has high elasticity such that the electrolyte can sustain large deformations in one or more deformation modes and recover its shape from the deformed shape.

In an embodiment the electrolyte retains high elasticity at temperatures up to temperatures of −20° C.

In an embodiment the electrolyte retains its electrical performance at temperatures up to −20° C. and the electrolyte retains its mechanical properties at temperatures up to −20° C.

In an embodiment the first substrate comprises a nickel-copper cloth and the second substrate comprises a cloth including a plurality of carbon nanotubes.

In an embodiment the metal layer comprises a zinc film that is electroplated into the nickel-copper cloth.

In an embodiment the cathode material layer comprises alpha phase manganese dioxide nanorods synthesized in situ among the carbon nanotubes of the second substrate.

In an embodiment the electrolyte further comprises 2 mol $L^{-1}$ zinc sulphate and 0.1 mol $L^{-1}$ manganese sulphate.

In an embodiment the ethylene glycol anionic polyurethane acrylate crosslink the polyacrylamide.

In an embodiment the electrolyte comprises at least 20% weight percentage of ethylene glycol polyurethane acrylate.

In an embodiment the electrolyte comprises at least 24% weight percentage of ethylene glycol polyurethane acrylate within the electrolyte.

In an embodiment the electrical energy supply device maintains at least 80% specific capacity with Coulombic efficiency is greater than 90% at temperatures below 0° C.

In accordance with a further aspect the present invention comprises a method of synthesizing an electrical energy supply device, the method comprising the steps of:
forming an anode,
forming a cathode,
synthesising a hydrogel electrolyte comprising ethylene glycol waterborne anionic polyurethane acrylates and polyacrylamide structures.

In an embodiment the step of synthesizing the hydrogel electrolyte comprises the steps of synthesizing a precursor of ethylene glycol based water borne polyurethane acrylates.

In an embodiment the step of synthesising the hydrogel electrolyte comprises the additional step of adding an initiator to initiate a free radical polymerization with the precursor and acrylamide.

In an embodiment the method comprises adding an end capping agent, wherein the end capping agent comprises hydroxyethyl methacrylate, wherein the end capping agent is configured to terminate the polymer chains.

In an embodiment the electrolyte is sandwiched between the anode and the cathode to form a multi-layer structure.

In an embodiment energy supply device is freeze resistant and can function at temperatures up to −20° C.

In an embodiment the energy supply device retains electrochemical performance and mechanical performance at temperatures up to −20° C.

In accordance with a further aspect the present invention comprises a method of synthesising an electrolyte for an energy supply device, the method comprising the steps of:
synthesising a precursor of ethylene glycol based waterborne anionic polyurethane acrylates,
adding an initiator to initiate a free radical polymerization with the precursor and acrylamide monomer.

In an embodiment the method comprises the step of adding an end capping agent, the agent comprising hydroxyethyl methacrylate.

In an embodiment the method comprises the step of dissolving monomers in a solution of zinc sulphate and manganese sulphate, wherein the monomers comprise ethylene glycol, isophorone diisocyanate and dimethylol propionic acid.

In an embodiment the initiator comprises ammonium persulphate.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

The term electrical energy supply device is a device that provides electrical energy. The term energy storage device may also be used to refer to an electrical energy supply device since an energy storage device can be used to store electrical energy and then supply this energy to another connected component.

The term battery as described herein defines one or more cells. The battery generates electrical energy from a chemical energy.

The term freeze resistant means resistant to freezing i.e. a state change at 0° C. i.e. the specific object that is freeze resistant does not undergo a state change at 0° C. The term anti-freeze and similar terms also mean freeze resistant.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 8a shows impedance spectra for a zinc manganese battery comprising a polyacrylamide electrolyte.

FIG. 8b shows impedance spectra for the battery of FIG. 1 comprising a freeze resistant electrolyte.

DETAILED DESCRIPTION OF A PREFERRED EMBODIMENT

Figure 1:
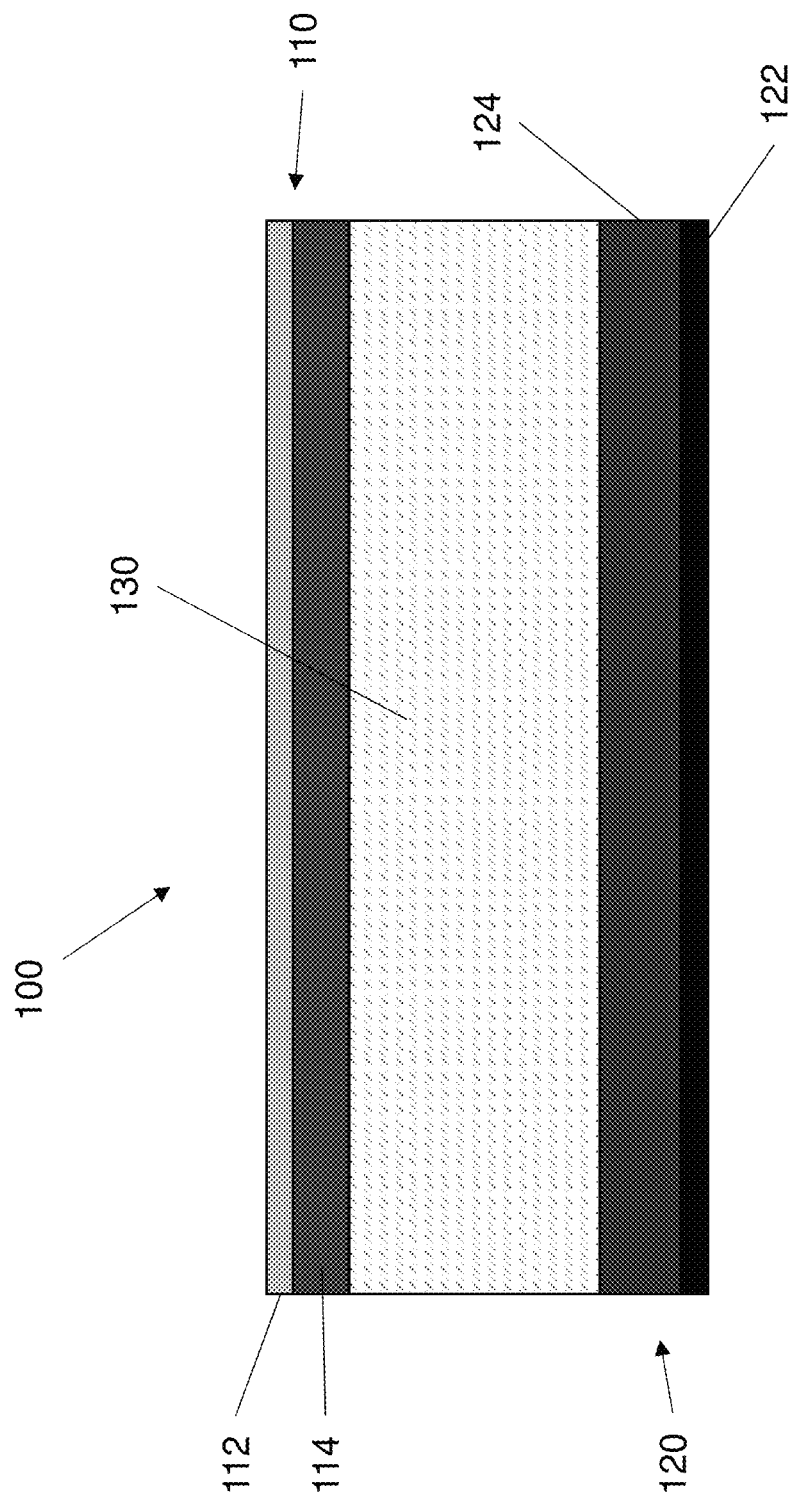
FIG. 1 shows a schematic diagram of a battery with a freeze resistant electrolyte.

Electronic devices e.g. portable electronics or wearable electronics are rapidly developing. Electronic devices require a power supply that is preferably low cost and safe. Electrical energy supply devices such as for example batteries can function as power supply devices in electronic devices such as for example wearable devices or portable electronic devices. Alternatively, energy storage devices such as for examples capacitors or supercapacitors can be used as electrical energy supply devices to function as power sources for electronic devices. The capacitors or supercapacitors can be charged by any suitable means or method. One example of a commonly used electrical energy supply device is an aqueous batteries based on hydrogel electrolytes. Such aqueous hydrogel based batteries or (capacitors or supercapacitors) are used as energy supply devices, particularly in flexible electronics, due to their intrinsic safety, eco-friendliness and mechanical flexibility. Such components are used energy storage devices and power supplies within flexible electronic devices e.g. wearable devices.

However, such aqueous hydrogel batteries include water molecules that exist in the polymer networks of the hydrogel. Conventional hydrogel electrolytes freeze and lose elasticity at sub-zero temperatures due to the water molecules freezing. The hydrogel electrolyte can undergo a state change and become a rigid electrolyte thereby losing elasticity and flexibility. Freezing of the hydrogel reduces or restricts the electrical performance (i.e. electrochemical performance). This limits the usability of flexible electronic devices in low temperature environments.

Currently two common approaches are adopted to fabricate a freeze resistant electrical energy supply device. One approach is to increase the solute density of the aqueous electrolyte to lower the freezing point by increasing acid or alkali or salt content of the electrolyte. However, such high concentrated solutions of acid or alkali or salt can cause severe corrosion and side reactions within the device, typically leading to performance degradation and failure of the electrical energy supply device. Another approach is to employ non aqueous organic electrolyte with a wide working temperature window.

However, most non aqueous electrolytes suffer from toxicity and flammability issues that require complex and expensive fabrication processes to create a safe device.

The present disclosure relates to an electrical energy supply device that is operable at sub-zero temperatures, in particular at temperatures below 0° C. Specifically, in at least one example, the electrical energy supply device to operate at temperatures between –10° C. to –20° C. without deterioration in electrical properties or electrical performance. Further the electrical energy supply device maintains mechanical properties at temperatures between 0° C. to –20° C. The electrical energy storage device maintains its elasticity at temperatures between 0° C. to –20° C., such that the electrical energy storage device can elastically deform.

Figure 2:
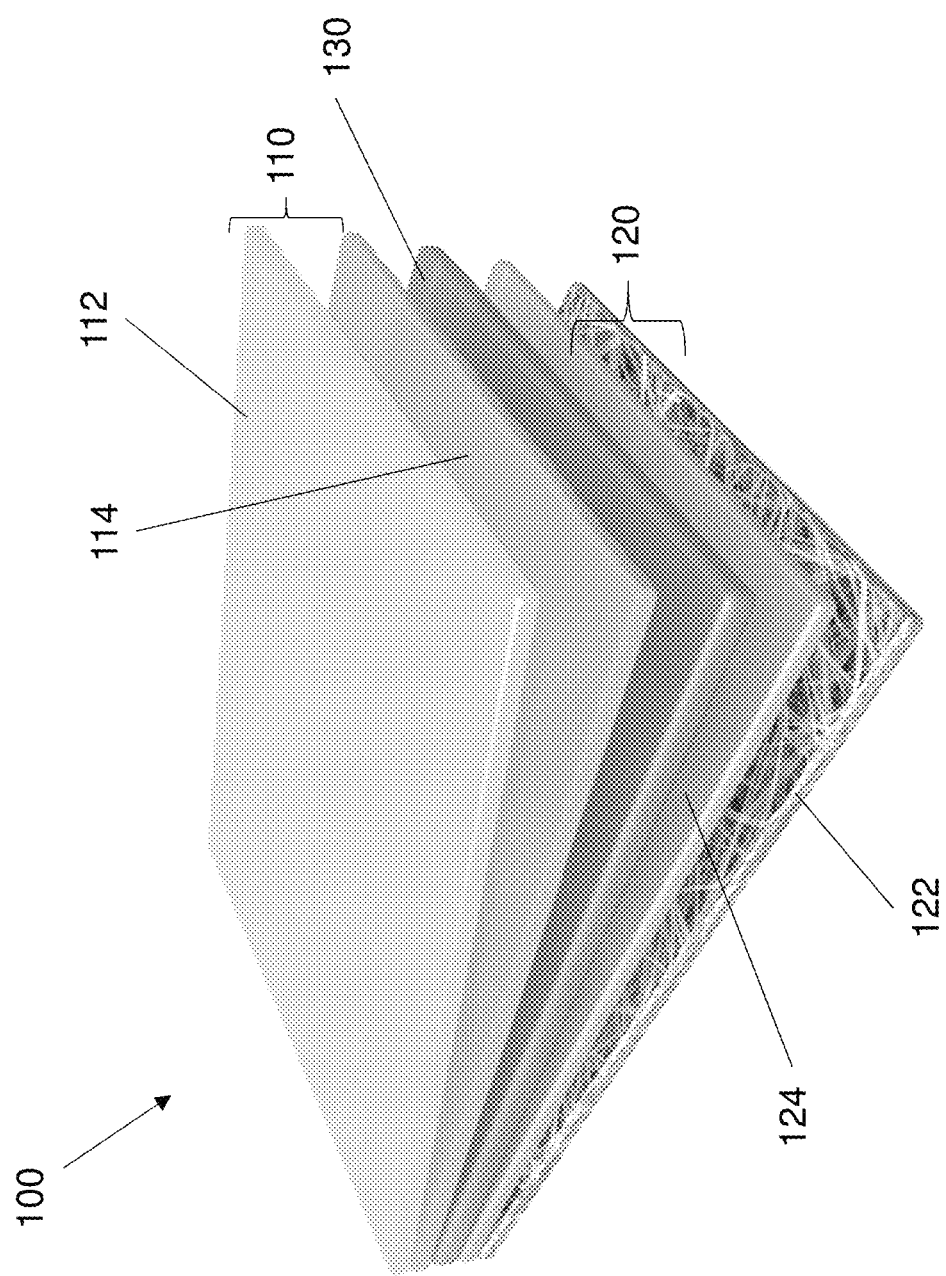
FIG. 2 shows an exploded view of the battery of FIG. 1.

FIGS. 1 and 2 show an embodiment of an electrical energy supply device 100. The illustrated embodiment of the electrical energy supply device 100 is a battery 100. The battery 100 generates electrical energy by an electrochemical reaction within the battery 100. The battery 100 retains its electrochemical performance and mechanical performance at sub-zero temperatures. The battery 100 retains its electrochemical performance and mechanical performance up to a temperature of –25° C., without any significant deterioration. The battery 100 is elastically deformable and flexible at temperatures up to –25° C. without any significant deterioration. The battery 100 as described herein is advantageous to use in flexible electronic devices or wearable devices because the battery maintains electrochemical performance and mechanical performance at temperatures below 0° C., and more specifically up to –25° C.

Referring to FIGS. 1 and 2, the electrical energy supply device 100 comprises an anode 110, a cathode 120 and an electrolyte 130 disposed between the anode 110 and the cathode 120. The electrical energy supply device 100 comprises a multi-layer laminate structure. The anode 110, cathode 120 and electrolyte 130 are arranged to form the multi-layer laminate structure. The anode 110 and the cathode 120 are electrically coupled by the electrolyte 130 such that ions can flow between the anode 110 and cathode 120, through the electrolyte 130. The illustrated electrical energy supply device 100 is a battery.

The electrical energy supply device 100 (i.e. battery) can also function as an electrical energy storage device that is configured to store electrical energy and supply electrical energy to other electronic components. The battery 100 produces electrical energy due to an electrochemical reaction. In one example, the battery 100 generates electrical energy by undergoing a redox reaction.

Referring again to FIG. 1 and FIG. 2, the anode 110 comprises a first substrate 112 and a metal layer 114 disposed on the first substrate 112. The first substrate 112 provides a foundation i.e. brace to support the metal layer support. The metal layer 114 comprises zinc or a zinc compound. Preferably the metal layer 114 comprises a zinc film disposed on a substrate 112, wherein the substrate comprises a flexible metal or metal alloy cloth. In the illustrated embodiment the first substrate 112 comprises a nickel-copper cloth. The anode 110 is substantially flexible, malleable and elastic due to the nickel-copper cloth.

Optionally the battery may comprise a metal pin on the anode 110 and a metal pin on the cathode 120. The metal pin extends in an outward direction. The metal pins function as electrical contact points to position the battery 100 in an electrical circuit and to connect circuit elements to the battery 100.

The cathode 120 comprises a second substrate 122 and a cathode material layer 124 disposed on the second substrate. The second substrate 122 comprises a carbon cloth. The carbon cloth comprises a plurality of carbon nanotubes that define the carbon cloth. The cathode material layer 124 comprises manganese dioxide material. In the illustrated embodiment the cathode material layer comprises alpha phase manganese dioxide. The alpha phase manganese dioxide is formed as manganese dioxide nanorods (i.e. nanotubes) that are synthesized in situ among the carbon nanorods (i.e. nanotubes).

The carbon cloth comprises acid treated carbon nanotube. The alpha phase manganese dioxide nanorods are dispersed in situ among the carbon nanotubes by a hydrothermal co-precipitation method. The hydrothermal co-precipitation method enhances the utilization ratio and conductivity of the manganese dioxide nanorods (i.e. nanotubes). The manganese dioxide nanorods are formed as a paste and the paste of the manganese dioxide nanorods are stuck on an inner side of the carbon cloth.

The manganese dioxide nanorods 124 comprise a diameter between 20 nm to 40 nm. The manganese dioxide nanorods 124 may be arranged in a lattice with a lattice spacing of between 0.6 nm to 0.7 nm. The nanorods 124 may be formed as a crystalline structure on the carbon cloth 122. The cathode 120 may optionally include polyvinylidene fluoride as a binder material to bind the manganese dioxide nanorods 124 to the carbon cloth 122.

The electrolyte 130 comprises a hydrogel electrolyte. The hydrogel electrolyte 130 is an anti-freeze electrolyte that has a lower freezing point than 0° C. and more preferably has a freezing point of below −20° C. The hydrogel is a polyacrylamide hydrogel. The hydrogel 130 comprises polyacrylamide chains defining backbone structures of the hydrogel.

The hydrogel 130 comprises an anti-freeze component or compound that reduces the freezing point of a polyacrylamide based hydrogel. The anti-freeze component or compound forms part of the electrolyte or may be mixed in with the electrolyte to change the freezing point. The addition of the anti-freeze component allows the electrolyte to operate at low temperature in particular sub-zero temperatures. The anti-freeze component allows the electrolyte and battery to maintain electrochemical functions at temperatures below 0° C. and up to −25° C. Preferably the battery 100 (and electrolyte 130) can continue to function i.e. maintain electrical performance (i.e. electrochemical performance) at temperature between 0° C. to −20° C., where other hydrogels often stop functioning. The anti-freeze component also allows the electrolyte 130 (and the battery 100) to retain its mechanical properties e.g. stiffness, flexibility, youngs modulus and retain mechanical performance (i.e. response to forces and deformations) in temperatures between 0° C. to −25° C., and more preferably between 0° C. and −20° C. The anti-freeze component allows the battery to remain a flexible battery that can be bent, stretched, compressed and twisted without breaking and have elasticity to return to its undeformed state when the force is removed, while maintaining its electrical performance (i.e. electrochemical performance).

The freeze resistant (i.e. anti-freeze) component is a glycol based polyurethane acrylate (or acrylates). More specifically the hydrogel electrolyte 130 comprises ethylene glycol based waterborne anionic polyurethane acrylates. The anionic polyurethane acrylates crosslink the polyacrylamide hydrogel backbones, thereby improving the mechanical strength of the integral network. The hydrogel chains comprise polyacrylamide and ethylene glycol based waterborne anionic polyurethane acrylates. The hydrogel chains form strong molecular clusters with water molecules in the electrolyte. The hydrogel chain and water molecular clusters form stronger bonds than hydrogen bonds between water molecules. The freezing process i.e. the ice crystallisation is precluded and the freezing point is decreased.

The ethylene glycol anionic polyurethane acrylates and the polyacrylamide form a matrix that defines the electrolyte. The polyurethane acrylates and polyacrylamide matrix form strong hydrogen bonds with the water which firmly locks water molecules in the hydrogel that precludes freezing since the water molecule crystallisation is reduced. The ethylene glycol waterborne anionic polyurethane acrylate polymer chains act as chemical covalent crosslinking points, significantly strengthening the network matrix. Hydrogen bonds form among the intra and intermolecular polyacrylamide polymer chains are formed, which dynamically homogenize the network and dissipate energy under deformation.

Figure 3:
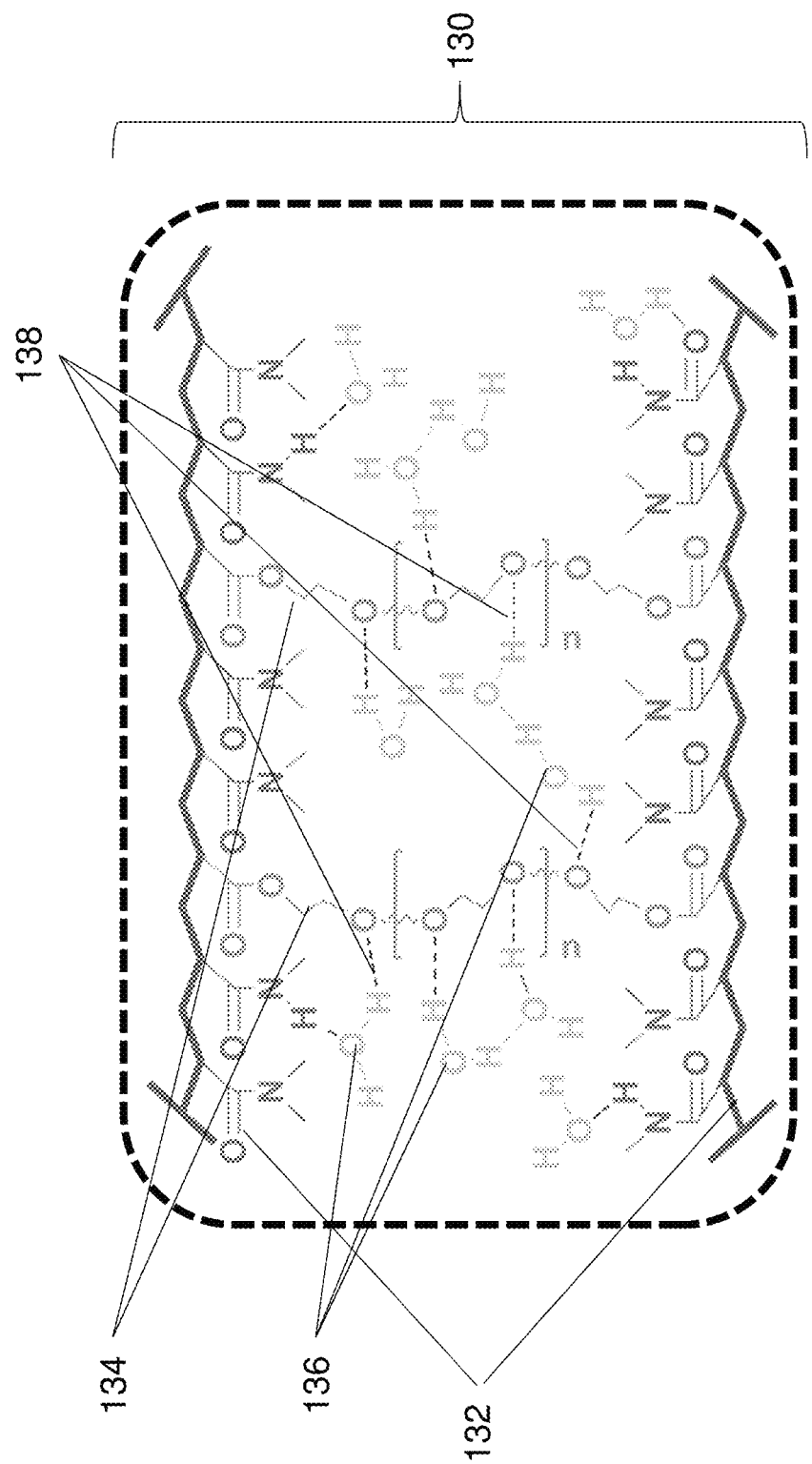
FIG. 3 shows a view of the chemical structures in the freeze resistant electrolyte.

FIG. 3 shows an example of the chemical structure of the electrolyte 130. As seen in FIG. 3 the electrolyte comprises an aqueous hydrogel that includes water molecules. The hydrogel includes a plurality polyacrylamide chains 134 and ethylene glycol based anionic polyurethane acrylates 134 that crosslink the polyacrylamide chains. FIG. 3 shows ethylene glycol based anionic polyurethane acrylate polymer structures 134 that crosslink the polyacrylamide chains 132. Hydrogen bonds between the polyurethane acrylate polymer structures and water molecules 136 are shown in FIG. 3. The hydrogen bonds 138 between the ethylene glycol anionic polyurethane acrylate polymer structures 134, water molecules 136 and the polyacrylamide 132 firmly lock water molecules 136 in the hydrogel.

The water molecules 136 provides sufficient interactions to enhance the interaction between the ethylene glycol based polyurethane acrylates 134 and the polyacrylamide chains 132. The water molecules 136 function as a bridge and connect the hydroxyl groups of the ethylene glycol anionic polyurethane acrylate structures and the carbonyl groups of the polyacrylamide chains together. This improved connection increases the binding energies. The water molecules being firmly locked reduces the ability of the water molecules to crystalize and form a solid structure i.e. form ice at 0° C. The electrolyte 130 comprises three interactions between ethylene glycol anionic polyurethane acrylate, the polyacrylamide chains and water molecules in the electrolyte. These interactions yield a binding energy between −16.5 to −17.5 Kcal/mol. The binding energy is much higher than water to water binding energy. This improved polymer structure, interactions between the components of the electrolyte and the higher binding energy is advantageous because it prevents freezing as the water to water binding cannot overcome the binding energies and the interactions between the electrolyte components.

The improved connection i.e. bonding between the various polymer chains and the higher binding energies between the water molecules and the other polymer chains of the electrolyte disrupts the formation of crystal lattices, thereby endowing the hydrogel electrolyte with excellent anti freezing properties. The polymerized structure of the ethylene glycol anionic polyurethane acrylate structures and polyacrylamide chains reduces the freezing point to below −20° C. such that the electrolyte does not freeze between 0° C. to −20° C.

Each of the anode 110, cathode 120 and electrolyte 130 form a multi-layer laminate structure that is flexible, elastic and bendable. The battery 100 is flexible, elastic and bendable. The electrolyte 130 is highly elastic and flexible. The electrolyte 130 can elastically deform in multiple modalities i.e. the electrolyte can deform in multiple ways when a force is applied. The electrolyte 130 returns back to its original state and shape when the force is removed. The structure of the electrolyte allows the electrolyte 130 to sustain large deformations such as for example twisting, stretching, bending and compressing in response to an external force. Once the external force is removed the electrolyte recovers to its original shape.

The mechanical performance of the electrolyte is achieved by tuning the weight percentage ($G_w$ %) of the ethylene glycol waterborne anionic polyurethane acrylates present in the hydrogel. A specific weight percentage of the ethylene glycol waterborne anionic polyurethane acrylate can be used to optimise compressibility, stretchability, elasticity and resilience of the hydrogel electrolyte as compared to a pure polyacrylamide based hydrogel. The mechanical resilience and strength of the hydrogel 130 as described can be attributed mainly to the following three factors.

First the hydrogel 130 comprises covalent interactions i.e. bonds between the ethylene glycol anionic polyurethane acrylate polymer structures 134 (e.g. chains) and the polyacrylamide polymer chains 132, as shown in FIG. 3. The hydrogel 130 if formed through covalent interactions of laterally associated ethylene glycol anionic polyurethane acrylate polymer structures and physical entanglements of the polyacrylamide polymer helices in extended junction zones. Second the ethylene glycol anionic polyurethane acrylate polymer structures 134 act as stress buffers that dissipate energy due to mechanical loads, thus strengthening the hydrogel 130 polymer network under deformation due to mechanical loads. Third, the polyacrylamide chains 132 provide sufficient intra-molecular hydrogen bonding, which can dynamically recombine to homogenise the network when external forces act on the hydrogel 130 (and battery 100). The dual cross-linked structure (i.e. the structure including ethylene glycol anionic polyurethane acrylate polymer structures and polyacrylamide chains) endows the hydrogel 130 with excellent mechanical properties.

The anti-freezing property of the electrolyte 130 is also determined on the weight percentage ($G_w$ %) of the ethylene glycol anionic polyurethane acrylate polymer. The electrolyte 130 comprises at least 20% ($G_w$ %) of ethylene glycol anionic polyurethane acrylate. More preferably the electrolyte 130 comprises at least 24% ($G_w$ %) of ethylene glycol anionic polyurethane acrylate polymer in the hydrogel. The electrolyte having at least 20% and more preferably 24% of ethylene glycol anionic polyurethane acrylate polymer structures did not freeze at −20° C. and continued to function without any significant loss in electrochemical performance (i.e. electrical performance) or mechanical performance.

The electrolyte 130 is a highly resilient electrolyte. The battery 100 is also flexible, elastic and bendable. The battery 100 is also highly resilient since the anode and cathode are formed on flexible structures and the electrolyte 130 is flexible and resilient. The elastic and resilient battery 100 as described is resistant to freezing and has a retains its electrical performance and mechanical performance (i.e. elasticity, flexibility and resilience) at temperatures up to −20° C.

The electrolyte may optionally also comprise a reaction solution. The reaction solution provides passage for ion exchange between the anode and cathode and also allows electrons to flow. The reaction solution comprises a zinc compound and a manganese compound. In one optional construction, the electrolyte comprises a reaction solution that includes a zinc sulphate ($ZnSO_4$) and manganese sulphate ($MnSO_4$). In this optional construction the reaction solution comprises 2 mol $L^{-1}$ of $ZnSO_4$ and 0.1 mol $L^{-1}$ of $MnSO_4$.

Figure 4A:
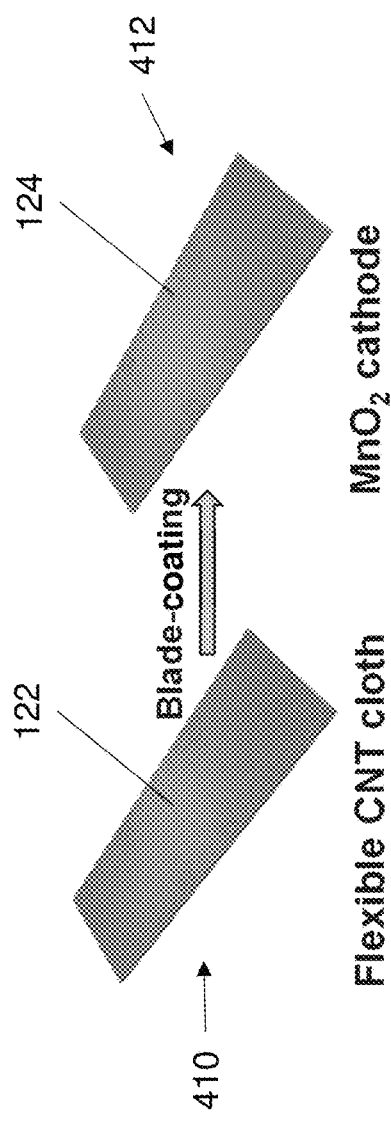
FIG. 4a shows a diagram of forming the cathode of the battery in FIG. 1.

FIG. 4a shows a drawing of a method of forming the cathode 120. As shown in FIG. 4a, step 410 comprises providing a carbon cloth 122. The carbon cloth comprises carbon nanorods (i.e. nanotubes) that are woven into a cloth. Step 412 comprises preparing a homogenous slurry of alpha phase manganese dioxide composite. The slurry of manganese dioxide comprises a plurality of manganese dioxide nanorods comprising a diameter of between 20 nm-40 nm. The manganese dioxide is blade-coated onto the piece of flexible carbon cloth 122. The manganese dioxide nanorods are formed in situ among well dispersed acid treated carbon nanotubes on the carbon cloth. The manganese dioxide paste (i.e. slurry) forms a lattice after the blade coating process. The lattice spacing of the manganese dioxide nanorods is between 0.6 nm to 0.7 nm, and in one example the spacing is 0.685 nm.

Figure 4B:
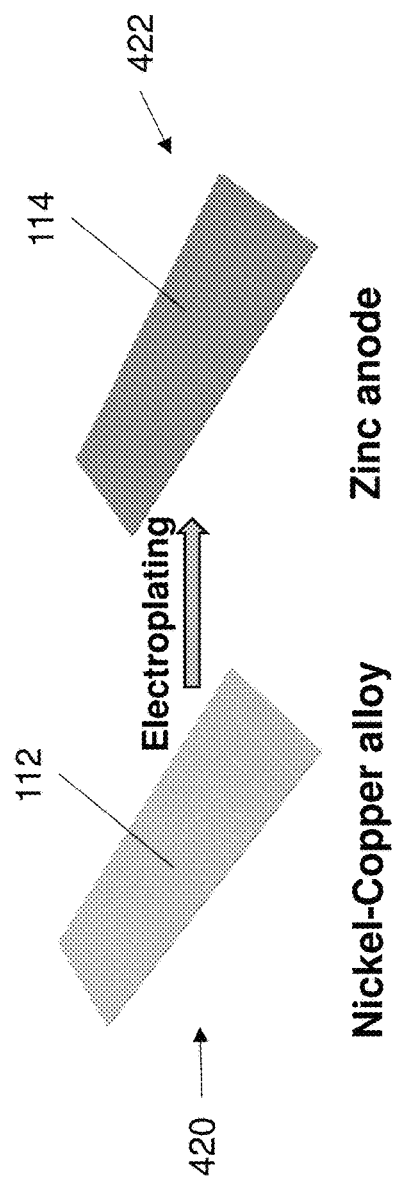
FIG. 4b shows a diagram of forming the anode of the battery in FIG. 1.

FIG. 4b shows a drawing of a method of forming the anode 110. As shown in FIG. 4b a nickel-copper cloth 112 is provided at step 420. Step 422 comprises electroplating zinc 114 onto the nickel-copper cloth. The zinc is electroplated as a uniform zinc film on the surface of the nickel-copper cloth. The nickel-copper cloth forms a substrate to support the zinc to form the anode. The nickel-copper cloth can comprise a flower like nanosheet structure that facilitates retention of zinc on the nickel-copper cloth 112. The nickel-copper cloth is formed by interweaving nickel and copper silks.

Figure 5A:
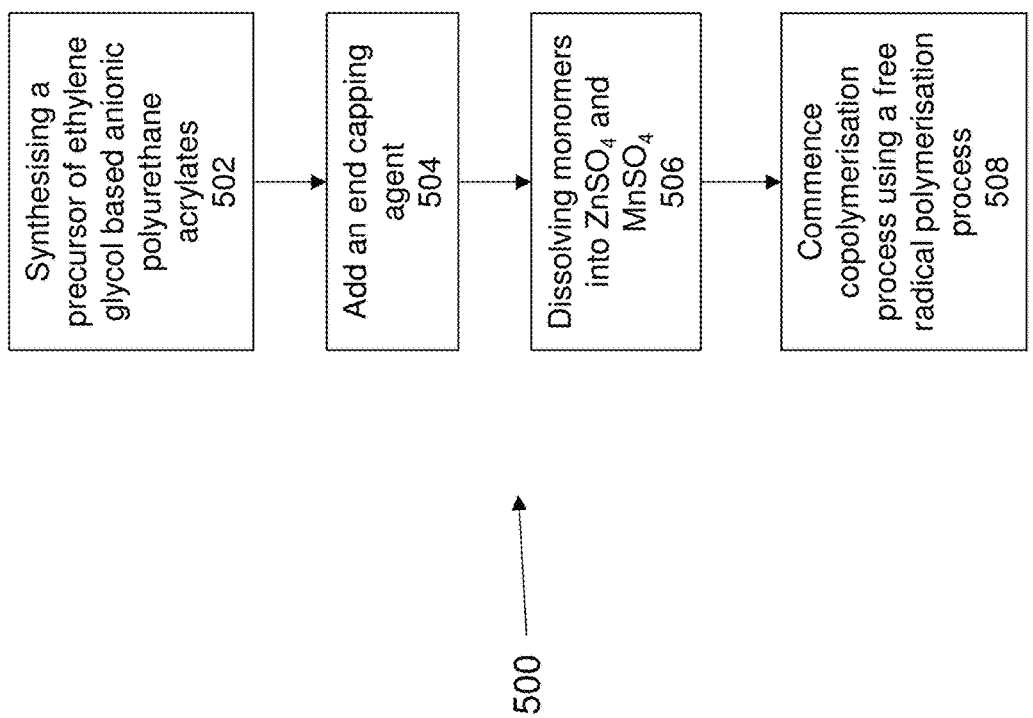
FIG. 5a shows a method of forming an electrolyte of the battery of FIG. 1.

FIG. 5a shows a method 500 of forming the electrolyte 130. The method 500 is an example method of forming the electrolyte 130. Method 500 commences at step 502 comprises synthesising a precursor of ethylene glycol based anionic polyurethane acrylates. Step 502 comprises synthesising a precursor of ethylene glycol based anionic polyurethane acrylates by using ethylene glycol, isophorone diisocyanate as monomers and 2,2 dimethylol propionic acid as chain extenders to form the double bonded ethylene glycol based anionic polyurethane acrylates. Step 502 comprises a polymerization process to form the ethylene glycol based anionic polyurethane acrylates. The ethylene glycol based anionic polyurethane acrylates are formed into a polymeric matrix. Inside this polymeric matrix, the hydroxyl groups of ethylene glycol molecules bind covalently with isocyanate groups, forming stable chemically anchor instead of simple hydrogen bonding interactions in polymer chains.

Step 504 comprises adding an end capping regent. The end capping regent comprises hydroxyethyl methacrylate (HEMA). Double bonds were introduced to terminate both sides of the polymer chains of the ethylene glycol based anionic polyurethane acrylate polymer chains.

Step 506 comprises dissolving ethylene glycol based anionic polyurethane acrylates, acrylamide monomers and ammonium persulphate into a mixture of $ZnSO_4$ and $MnSO_4$. This dissolving step is used to introduce Zn ions and Mn ions into the electrolyte. The ammonium persulphate functions as an initiator.

Step 508 comprises copolymerisation of ethylene glycol based anionic polyurethane acrylates and acrylamide monomers through a free radical polymerisation method to form the hydrogel electrolyte 130 comprising ethylene glycol based anionic polyurethane acrylate and polyacrylamide. Step 508 comprises heat treating the mixture of step 506 at 60 degrees Celsius in order to cause the copolymerisation process.

Figure 5B:
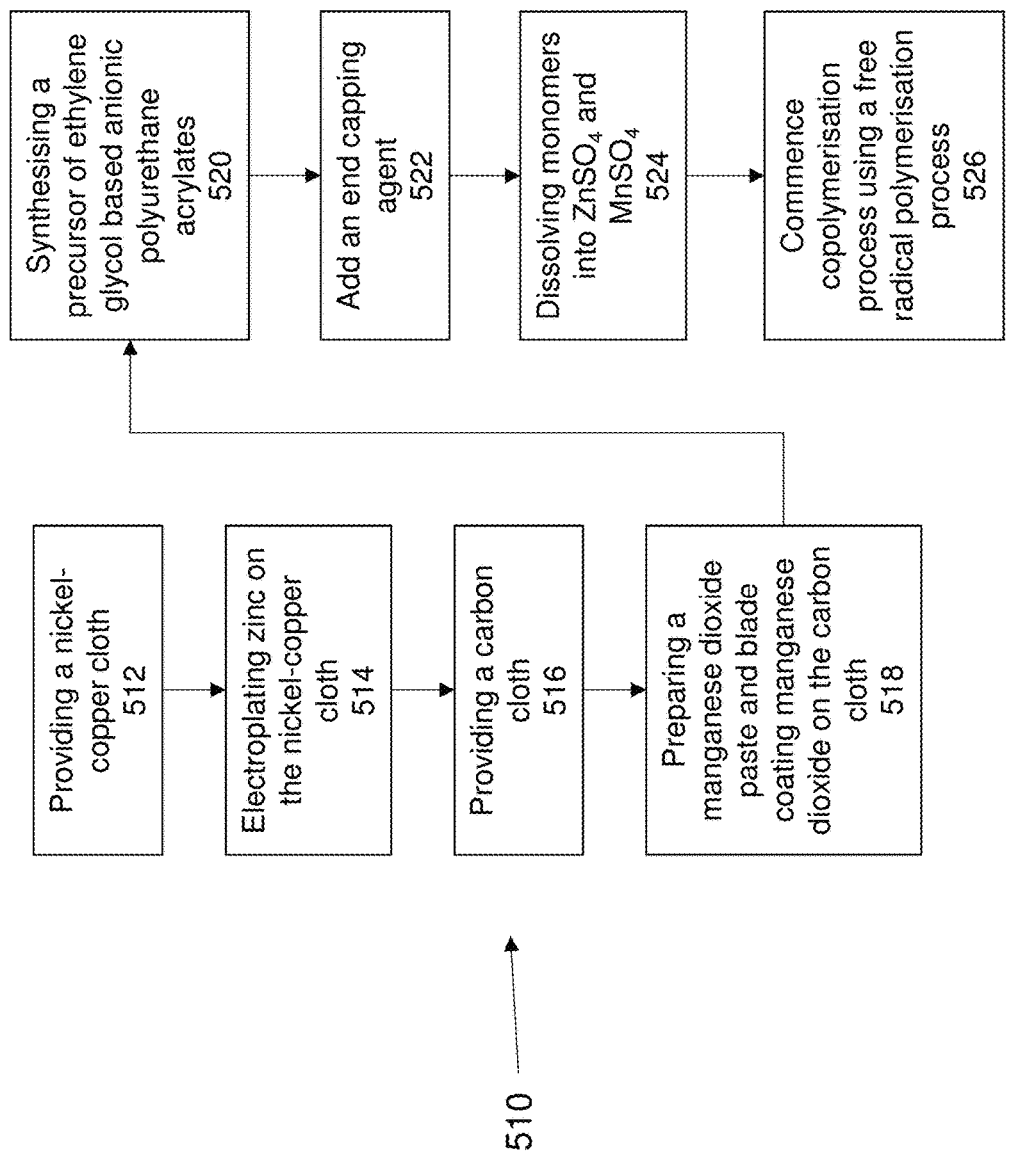
FIG. 5b shows a method of forming the battery of FIG. 1 including a freeze resistant electrolyte.

FIG. 5b shows a method 510 of forming a battery 100 that includes a freeze resistant (i.e. an anti-freeze) electrolyte that has a freezing point of below 0 degrees Celsius. The method 510 comprises the steps shown in FIGS. 4a, 4b and 5a. Referring to FIG. 5b the method 510 commences at step 512. Step 512 comprises providing a nickel-copper cloth 112. Step 514 comprises electroplating zinc 114 onto the nickel-copper cloth. Steps 512 and 514 are similar to steps 420, 422 and together define preparing an anode. Step 516 comprises providing a carbon cloth 122. The carbon cloth comprises carbon nanorods (i.e. nanotubes) that are woven into a cloth. Step 518 comprises preparing a homogenous slurry of alpha phase manganese dioxide composite and blade coating the carbon cloth with the manganese dioxide paste such that the manganese dioxide is attached to the flexible carbon cloth. Step 520 comprises synthesizing a precursor of ethylene glycol based anionic polyurethane acrylates, using ethylene glycol, isophorone diisocyanate as monomers and 2,2 dimethylol propionic acid as chain extenders to form the ethylene glycol based anionic polyurethane acrylates. Step 520 is similar to step 502. Step 522 comprises adding an end capping agent e.g. hydroxyethyl methacrylate (HEMA). Step 522 is similar to step 504 described earlier. Step 524 comprises dissolving monomers into $ZnSO_4$ and $MnSO_4$. More specifically step 524 comprises dissolving ethylene glycol based anionic polyurethane acrylates, acrylamide monomers and ammonium persulphate into a mixture of $ZnSO_4$ and $MnSO_4$. Step 526 comprises copolymerisation of ethylene glycol based anionic polyurethane acrylates and acrylamide monomers through a free radical polymerisation method to form the hydrogel electrolyte. Step 526 further includes comprises heat treating the mixture of step 524 at 60 degrees Celsius in order to cause the copolymerisation process. The method 510 results in a multi-layer laminate structure battery 100. The battery 100 components may be disposed in a flexible urethane or resin casing.

The battery 100 as described herein comprises a specific capacity of 275 mA h$g^{-1}$ at a current density of 0.2 A$g^{-1}$ with a voltage of 1.8 V and a high volumetric energy density of approximately 32.68 mW h $cm^{-3}$. Even at cold temperatures of up to $-20°$ C. the battery provides a high specific capacity of up to 226 mA h $g^{-1}$ (i.e. 82% of the pristine one) at 0.2 A $g^{-1}$. The battery 100 also exhibits high capacity retention approaching as high as 72.54% of the initial value after 600 cycles at 2.4 A $g^{-1}$. The battery retains its electrochemical performance at temperatures as low as $-30°$ C.

Figure 6B:
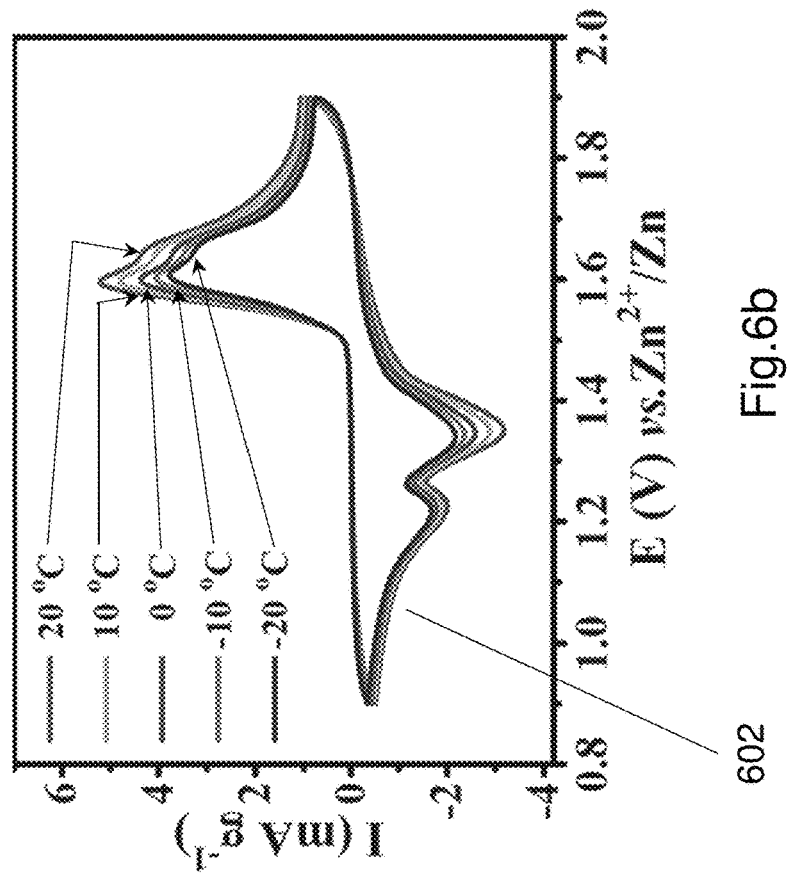
FIG. 6b shows a CV profile including multiple CV curves for the battery of FIG. 1 including a freeze resistant electrolyte.
Figure 6A:
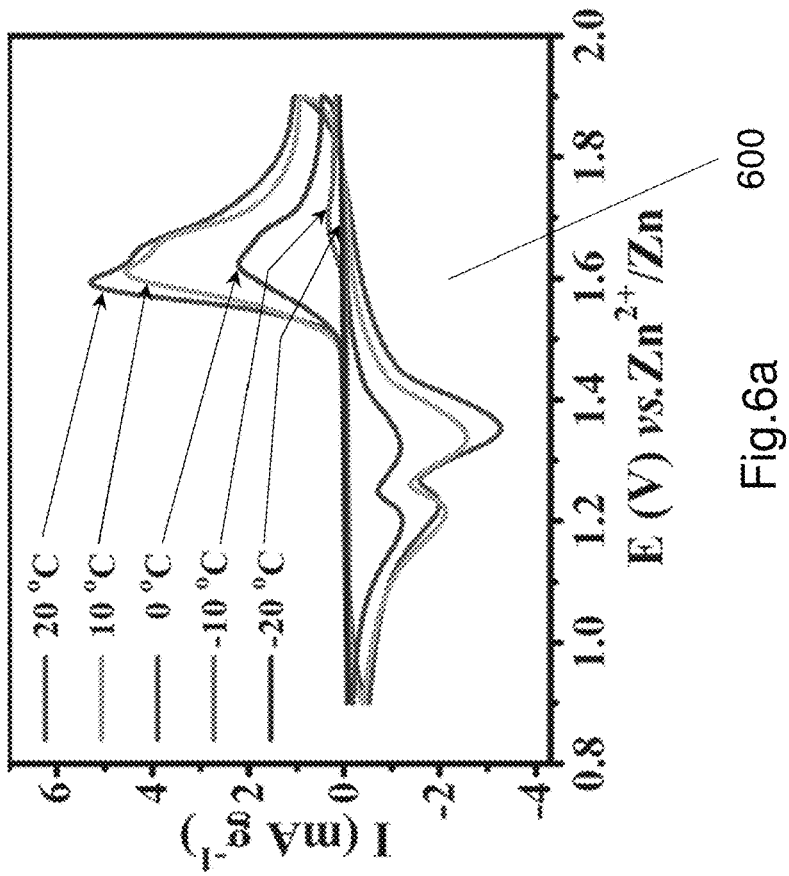
FIG. 6a. shows a CV profile including multiple CV curves for a zinc manganese battery including a standard polyacrylamide electrolyte.

The battery 100 (i.e. a zinc manganese battery) comprising an anti-freezing electrolyte 130 (AF-ZMB) as described herein was tested in comparison to a zinc manganese battery having a polyacrylamide electrolyte (PAM-ZMB). FIGS. 6a and 6b shows CV profiles of the AF ZMB 100 and PAM ZMB recorded for several minutes at $-20$, $-10$, 0, 10 and 20 degrees Celsius. FIG. 6a shows a CV profile 600 including multiple CV curves for the PAM-ZMB and FIG. 6b shows a CV profile 602 for the battery 100 comprising an anti-freeze (i.e. freeze resistant) electrolyte 130 (i.e. AF-ZMB). The CV profiles are one indicator of electrochemical performance. AS can be seen from FIG. 6 the charge-discharge curves for the PAM-ZMB decreased significantly at temperatures below $0°$ C. The redox peaks vanished at $-10°$ C. for the PAM-ZMB battery. In comparison all the CV curves, for the AF-ZMB 100 displayed distinguished redox peaks with almost equal peak intensity as well as negative voltage polarisation. This indicates better reaction reversibility in cold conditions for the battery 100 as described herein as compared to a PAM-ZMB battery.

Figure 7B:
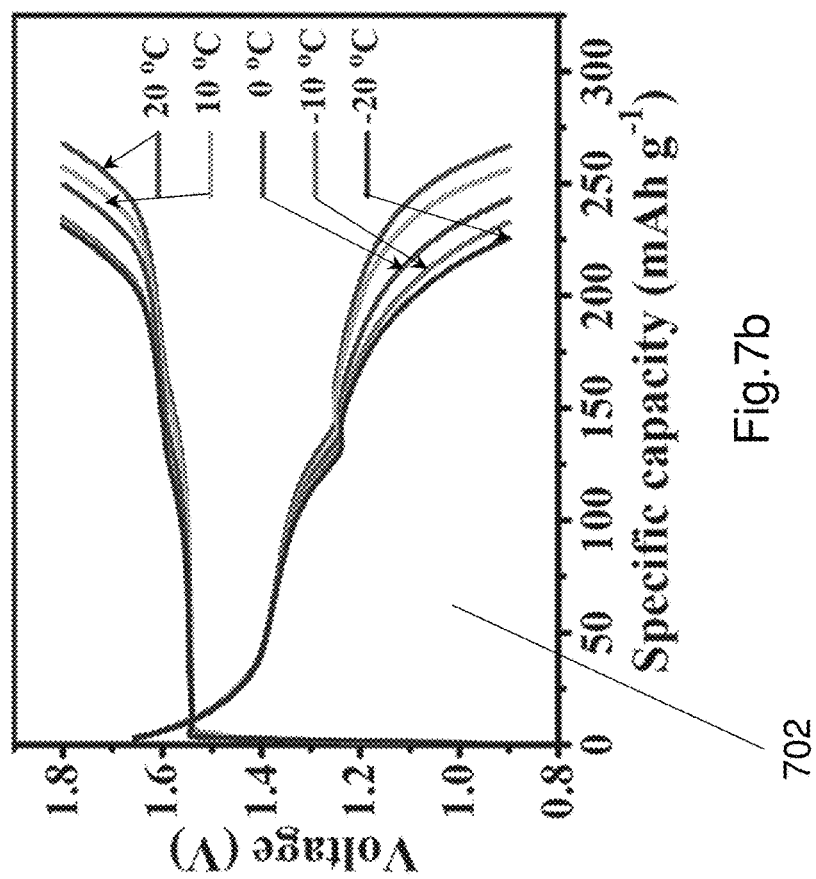
FIGS. 7a and 7b show galvanostatic charge-discharge (GCD) curves at 0.2 A $g^{-1}$ comparing electrochemical performance of a polyacrylamide electrolyte zinc manganese battery as compared to the battery of FIG. 1.
Figure 7A:
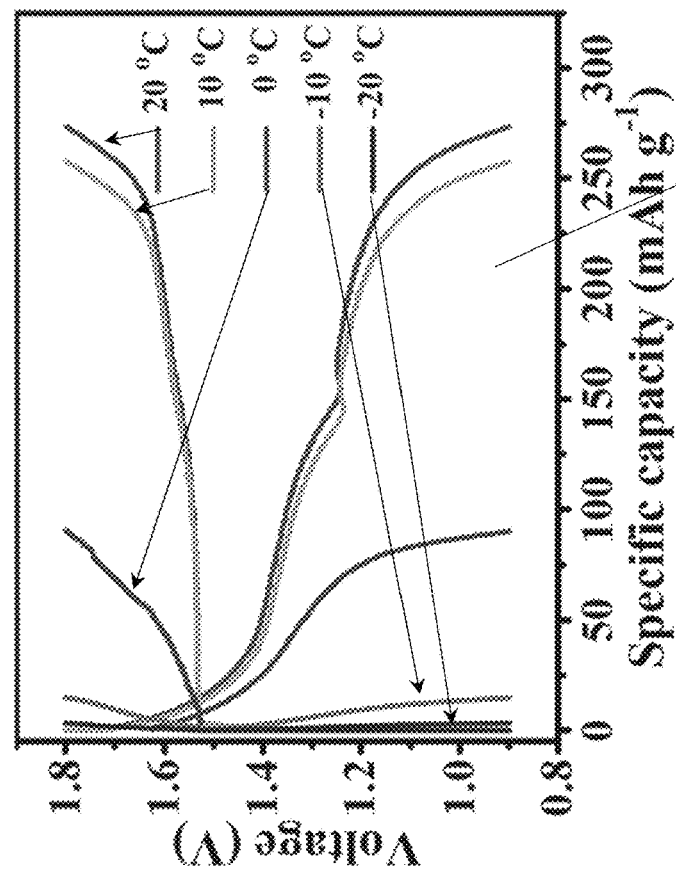

FIGS. 7a and 7b show galvanostatic charge-discharge (GCD) curves at 0.2 A $g^{-1}$ comparing electrochemical performance of prior art polyacrylamide electrolyte zinc manganese battery (PAM-ZMB) as compared to the zinc manganese battery 100 of the present invention that comprises an anti-freeze electrolyte (AF-ZMB). FIG. 7a shows a GCD curve 700 of the PAM-ZMB battery and FIG. 7b shows a GCD curve 702 of the AF-ZMB. As can be seen from the curves 700 and 702, the AF-ZMB (i.e. battery 100) delivered a specific capacity of 226 mA h $g^{-1}$ at $-20°$ C. as compared to approximately 0 mA h $g^{-1}$ at $-20°$ C. for the PAM-ZMB. The discharge capacity retention of the AF-ZMB 100 at 0 and $-20$ degrees Celsius with that at 20 degrees Celsius are 88.36% (243 mA h $g^{-1}$) and 82.18% respectively, showing that the battery 100 (i.e. AF-ZMB) retains its electrochemical properties and performance at sub-zero temperatures. This is due to the structure of the hydrogel remaining intact and the hydrogel not freezing.

FIGS. 8a and 8b show EIS spectra (i.e. impedance spectra) for a polyacrylamide zinc-manganese battery (PAM-ZMB) and the battery 100 as per the present invention i.e. an anti-freeze zinc-manganese battery (AF-ZMB). FIG. 8a shows impedance spectra 800 for the PAM-ZMB and FIG. 8b shows impedance spectra 802 for the AF-ZMB. (i.e. battery 100). For each battery the EIS spectra i.e. impedance spectra were recorded at $20°$ C., $0°$ C. and $-20°$ C. Upon cooling from $20°$ C. to $-20°$ C. the impedance of the PAM-ZMB increased considerably e.g. from 170 ohms to 7400 ohms due to freezing of the electrolyte. The freezing of the electrolyte reduces particle movement of the electrolyte and increases the impedance significantly compromising function of the PAM-ZMB battery. In contrast, the impedance of the AF-ZMB (i.e. battery 100) increased slightly from 252 ohms to 487 ohms, preserving the electrochemical performance of the battery 100 (i.e. AF-ZMB). The improved ion conductivity and performance is intrinsically ascribed to the low temperature durability and high compatibility with the electrodes of the anti-freeze gel (i.e. electrolyte 130). The results show the battery 100 can retain its electrochemical performance and continue to operate at temperatures of −20 degrees Celsius.

Figure 9:
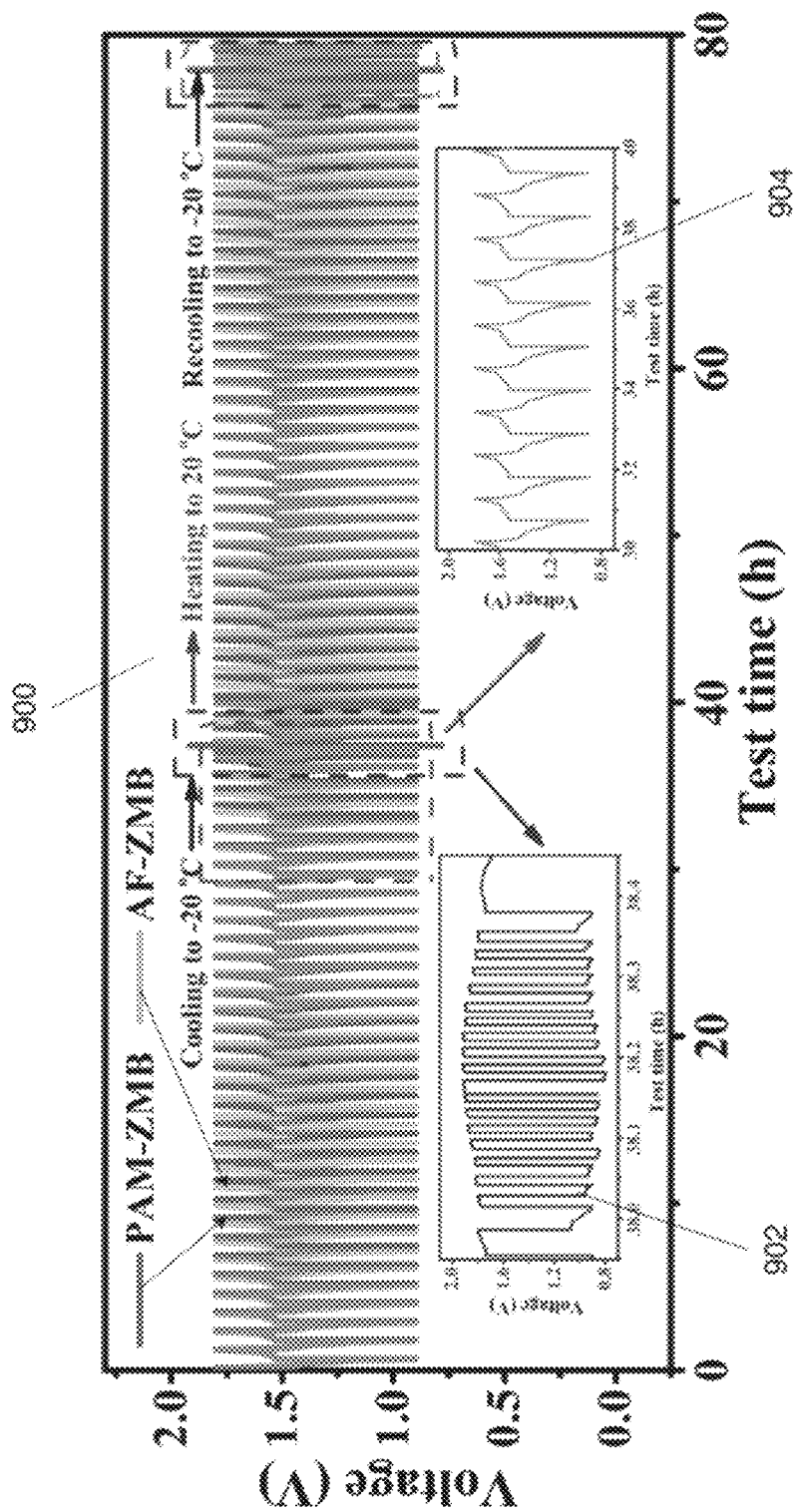
FIG. 9 shows a plot of voltage profiles of the battery comprising an anti-freeze zinc manganese battery (AF-ZMB) and zinc manganese battery including a polyacrylamide electrolyte.

FIG. 9 shows a plot 900 of voltage profiles of the battery 100 (i.e. an anti-freeze zinc manganese battery (AF-ZMB) and a prior art polyacrylamide zinc manganese battery (PAM-ZMB). The voltage profiles are across an extended length of time and includes cooling and warming of each battery. A selected section of the voltage profile of the PAM-ZMB is shown in plot 902. A selected section of the voltage profile of the AF-ZMB (i.e. battery 100) is shown in plot 904. The AF-ZMB (i.e. battery 100) showed a stable rechargability without obvious voltage change upon cooling. In contrast the PAM-ZMB exhibited notably large augment of the voltage hysteresis, especially when the temperature reduced to −20° C. This is evident from the plots 902 and 904. The plot in 904 is substantially stable and there is hardly any change in the voltage hysteresis at low temperatures. This is due to the stability of the electrochemical performance of the electrolyte 130 (i.e. the anti-freeze properties of the electrolyte 130).

Figure 10:
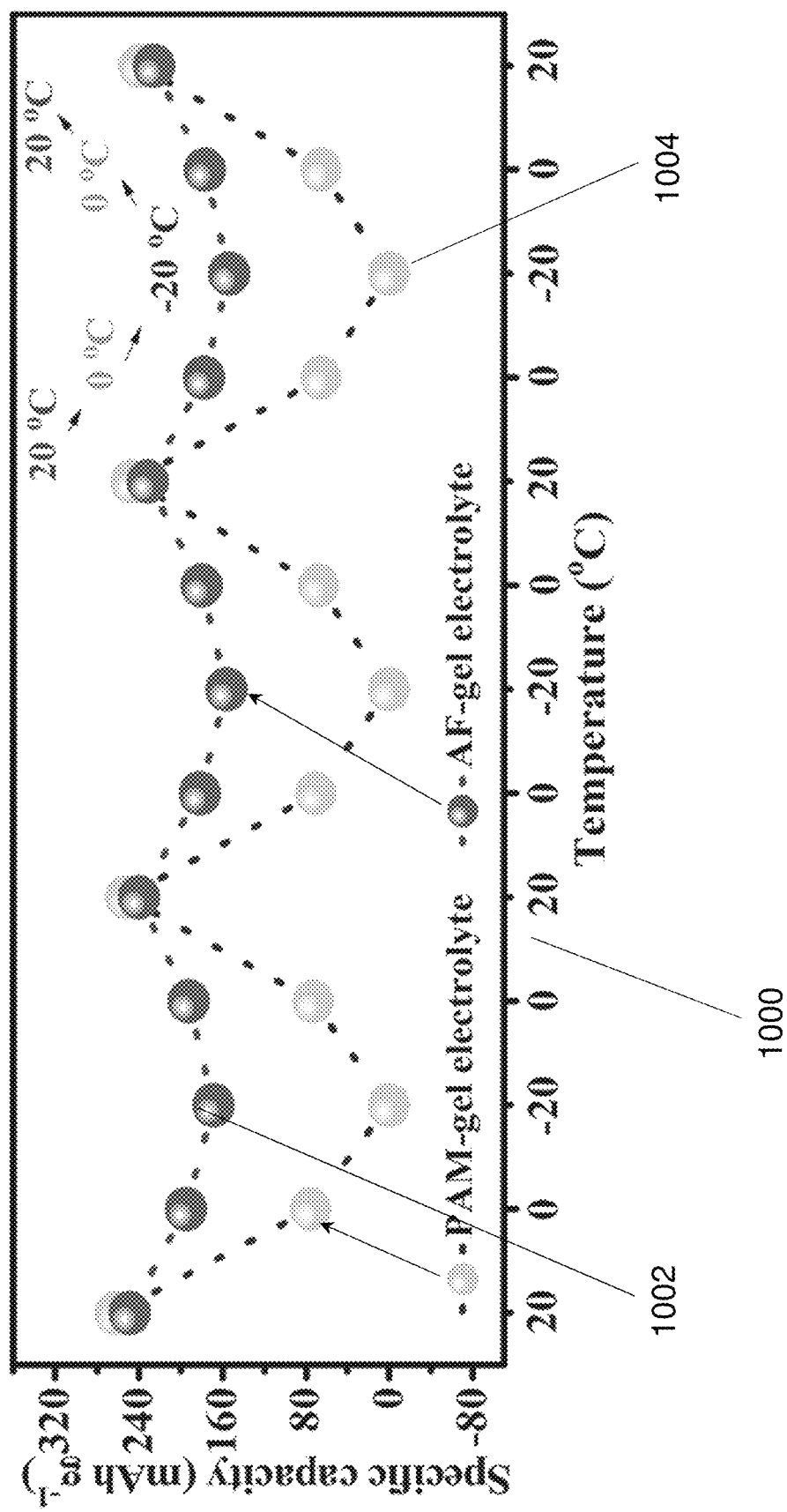
FIG. 10 shows a plot of cyclic testing of the battery including a freeze resistant electrolyte and a battery comprising only a polyacrylamide electrolyte.

FIG. 10 shows a plot 1000 of cyclic testing of various electrolytes of a zinc manganese battery. In particular, the plot 1000 shows specific capacity changes as temperature of each electrolyte is changed. Plot 1002 is the plot of the electrolyte 130 that includes ethylene glycol based anionic polyurethane acrylates in a polyacrylamide hydrogel. Plot 1004 is the plot of specific capacity of an electrolyte that includes only polyacrylamide hydrogel. The plot 1000 indicates experimental results of cyclic testing at different temperatures that was performed. For the PAM-ZMB battery, a degraded capacity upon cooling is evident from plot 1004. The PAM-ZMB retains only 27.44% at 0° C. and 0.01% at −20° C. In contrast, the AF-ZMB (i.e. battery including electrolyte 130) delivered higher capacity at 20° C. In this test the capacity was 244 mA h $g^{-1}$. When the temperature dropped from 20° C. to 0° C. and −20° C., the specific capacity at lower temperature was substantially retained. As seen from plot 1002 the capacities at temperatures of 0 and −20 degrees C. are at approximately 85% and 80% respectively of that delivered at 20 degrees C. While the temperature is increased from 0 to 20 degrees C. the specific capacity of the electrolyte 130 (and hence battery 100 i.e. AF-ZMB) is almost all restored. As seen from FIG. 10 multiple heating and cooling cycles have no significant specific capacity attenuation on the battery 100 and electrolyte 130.

The battery 100 and electrolyte 130 also comprise stable rechargability. The specific capacity is stable during multiple charge and discharge cycles without any obvious voltage change upon cooling. It was found that even after 600 cycles of charging and discharging the battery 100 retained approximately 87% specific capacity. The various graphs in FIGS. 6a to 10 show the electrochemical performance of the battery 100 (and electrolyte 130). These graphs also show that the electrochemical performance of the battery 100 including an anti-freeze electrolyte has improved electrochemical performance as compared to standard zinc-manganese battery.

The battery 100 comprises flexible components, specifically a flexible anode, flexible cathode and a flexible hydrogel electrolyte. The battery 100 remains over 96% under various deformations and is capable of continually power a connected electronic component while being bent, folded and twisted. The mechanical performance of the battery 100 is retained at low temperatures i.e. up to temperatures of −25° C. The battery 100 can be bent up to 90° without breaking and without compromising electrochemical performance. Various mechanical tests were conducted.

Figure 11:
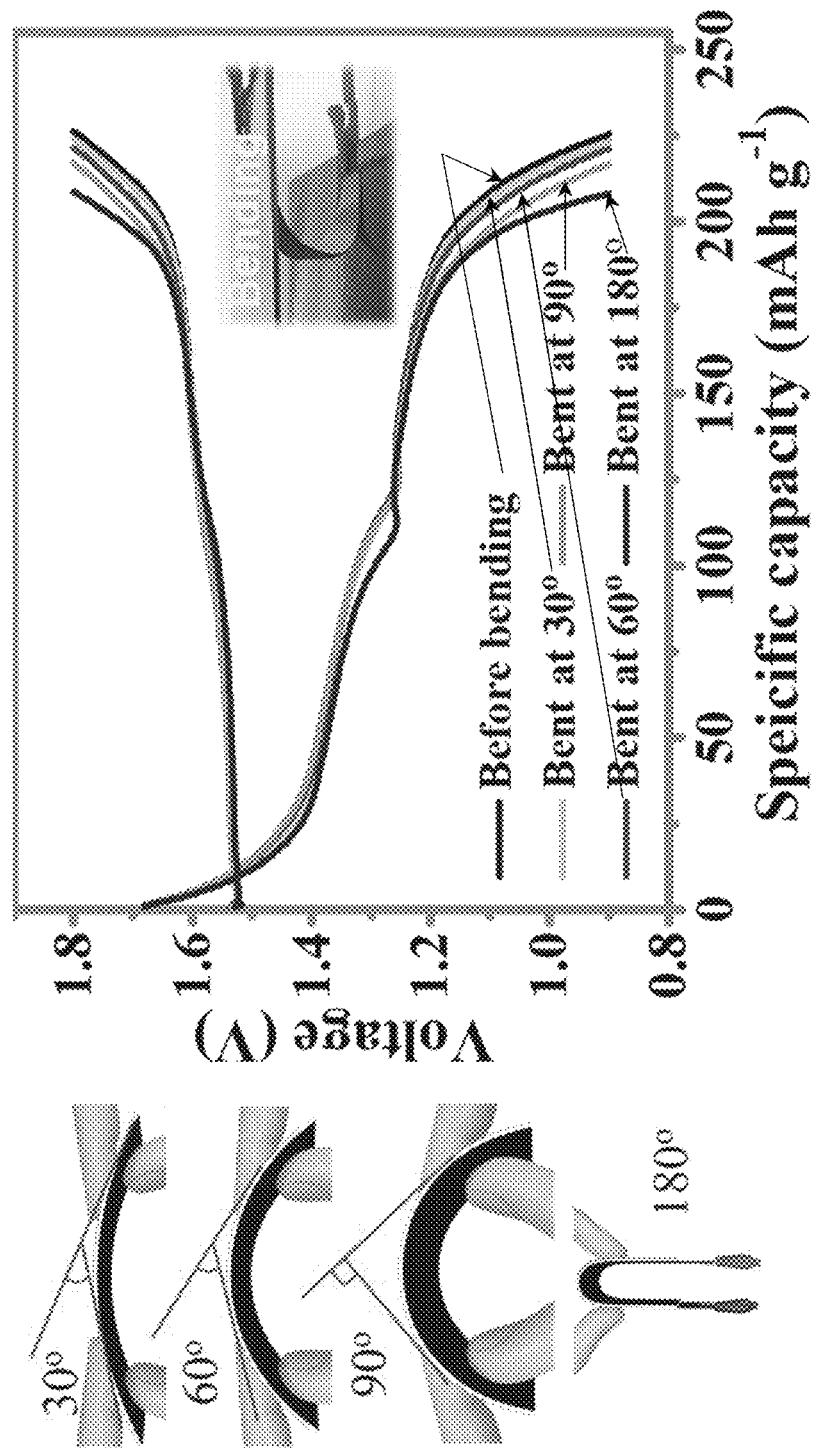
FIG. 11 shows a plot of various GCD curves at 0.2 A $g^{-1}$ as the battery including a freeze resistant electrolyte is bent at various angles.

FIG. 11 shows a plot 1100 of various GCD curves at 0.2 A $g^{-1}$ as the battery 100 is deformed. The battery 100 is bent at different angles. The battery 100 is bent at 30°, 60°, 90° and 180°. As seen from FIG. 11 the charge-discharge voltage plateaus are around 1.6V and 1.35V. As can be seen from FIG. 11 there is very little variation in voltage vs specific capacity at the different bending angles. This shows the battery 100 retains its electrochemical performance at different deformations. The shape of the battery 100 is returned when the force is removed.

Tests for impact resistance of the battery 100 at cold temperatures, specifically at a temperature of −20° C. after the battery had been stored for a day at −20° C. The tests showed that a standard zinc-manganese battery including a PAM electrolyte cracked when hammered due to the electrolyte being frozen. In contrast the battery 100 comprising an anti-freeze electrolyte 130 does not crack or fracture and continues to function as a battery at −20° C. Conventional zinc-manganese batteries with a PAM electrolyte fracture or break or shatter at temperatures well below 0° C. due to the electrolyte freezing. The battery 100 comprises an anti-freeze electrolyte which allows the battery to continue to function as a battery without cracking, breaking or fracturing. The battery 100 is flexible and resilient at low temperatures e.g. between 0° C. to −20° C. The battery 100 at low temperatures can sustain large deformations in response to a force applied to the battery and can quickly recover when the force is removed. The battery 100 retains its electrochemical and mechanical properties at low temperatures e.g. between 0° C. to −20° C.

The battery 100 as described herein can be used in various applications. The battery 100 can be used as part of a wearable device e.g. a smartwatch or smart garments. The battery can be flexed, bent, deformed while still maintaining its electrical performance. Another example application is to power an electroluminescent panel or panel lights. The mechanical robustness of the battery 100 and electrolyte 130 allows the battery 100 to be used in a number of different applications. The flexibility also improves and increases the usage of the battery 100 e.g. in wearable devices. The anti-freeze electrolyte 130 used in the battery 100 can be used in very low temperature applications. For example, the battery 100 can be used in cold climates e.g. as a power source in cold climate countries since the battery 100 continues to function in low temperatures.

In an alternative configuration the anode comprises a copper or copper compound. The substrate of the anode is a flexible cloth like structure that is conductive. In this alternative configuration the flexible cloth may be impregnated with conductive material e.g. graphite or metal. The cloth comprises a flexible substrate made of a semiconductor material or a conductive material e.g. silicone or a metal film. The cloth is flexible to allow the battery to flex, bend, twist or deform in several axes. The cathode can comprise a substrate similar to the structure of the anode, in this alternative configuration.

The electrical energy supply device as described herein is a battery to convert chemical energy to electrical energy. The current embodiments described herein are embodiments of batteries. In an alternative embodiment the structure described with reference to FIG. 1 or FIG. 2 may be applied to a capacitor design or a supercapacitor design, wherein the capacitor may comprise an electrolyte that is freeze resistant. The freeze resistant capacitor or supercapacitor is flexible and elastically deformable due to the elasticity and flexibility of the electrolyte. The electrical performance and the mechanical performance of a capacitor or supercapacitor comprising a construction including a freeze resistant electrolyte as described herein, is maintained (i.e. does not deteriorate) at temperatures below 0° C., preferably at temperatures between 0° C. to −20° C. Even more preferably the electrical properties and mechanical properties are not deteriorated at such temperatures.

The various graphs and plots described herein were derived from testing performed by the inventor or a third party engaged by the inventor to illustrate the effectiveness of the battery described herein. The graphs and plots are the test results of battery 100 as per the present invention (i.e. including an anti-freeze electrolyte) and a prior art zinc manganese battery without an anti-freeze electrolyte.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An electrical energy supply device comprising:
an anode;
a cathode;
an electrolyte disposed between the anode and the cathode;
the electrical energy supply device is freeze resistant such that the electrical energy supply device can operate at a temperature below 0° C. without deterioration in electrical properties or electrical performance, wherein the cathode comprises manganese dioxide nanorods disposed in situ among carbon nanotubes.

2. An electrical energy supply device in accordance with claim 1, wherein the cathode comprises a paste comprising the manganese dioxide nanorods and the carbon nanotubes.

3. An electrical energy supply device comprising:
an anode;
a cathode;
an electrolyte disposed between the anode and the cathode;
the electrical energy supply device is freeze resistant such that the electrical energy supply device can operate at a temperature below 0° C. without deterioration in electrical properties or electrical performance, wherein the electrolyte is a freeze resistant hydrogel electrolyte such that the freezing point of the electrolyte is below −20° C.

4. An electrical energy supply device in accordance with claim 3, wherein the electrolyte comprises glycol compounds.

5. An electrical energy supply device comprising:
an anode;
a cathode;
an electrolyte disposed between the anode and the cathode;
the electrical energy supply device is freeze resistant such that the electrical energy supply device can operate at a temperature below 0° C. without deterioration in electrical properties or electrical performance, wherein the electrolyte comprises ethylene glycol polyurethane acrylate.

6. An electrical energy supply device in accordance with claim 5, wherein the electrolyte comprises ethylene glycol waterborne anionic polyurethane acrylate, the electrolyte further comprises a polyacrylamide hydrogel and wherein the ethylene glycol anionic polyurethane acrylate crosslink the polyacrylamide.

7. An electrical energy supply device in accordance with claim 5, wherein the electrolyte comprises at least 20% weight percentage of ethylene glycol polyurethane acrylate.

8. An electrical energy supply device in accordance with claim 5, wherein the electrolyte comprises at least 24% weight percentage of ethylene glycol polyurethane acrylate within the electrolyte.

9. An electrical energy supply device comprising:
an anode;
a cathode;
an electrolyte disposed between the anode and the cathode;
the electrical energy supply device is freeze resistant such that the electrical energy supply device can operate at a temperature below 0° C. without deterioration in electrical properties or electrical performance, wherein the electrical energy supply device maintains at least 80% specific capacity with Coulombic efficiency is greater than 90% at temperatures below 0° C.

10. An electrical energy supply device in accordance with claim 1, wherein the manganese dioxide nanorods comprise a diameter between 20 nm and 40 nm.

11. An electrical energy supply device comprising;
a multi-layer laminate structure, the multi-layer laminate structure including:
an anode including a first substrate and a metal layer disposed on the first substrate,
a cathode including a second substrate and a cathode material layer disposed on the second substrate,
an ethylene glycol waterborne anionic polyurethane acrylate and polyacrylamide hydrogel electrolyte, wherein the hydrogel electrolyte resists freezing up to a temperature of −20° C.; and
wherein the electrolyte has an elasticity that allows the electrolyte to sustain deformations in one or more deformation modes and recover its shape from the deformed shape.

12. An electrical energy supply device in accordance with claim 11, wherein the electrolyte retains the elasticity at temperatures up to temperatures of −20° C.

13. An electrical energy supply device in accordance with claim 11, wherein the electrolyte retains its electrical performance at temperatures up to −20° C. and the electrolyte retains its mechanical properties at temperatures up to −20° C.

14. An electrical energy supply device in accordance with claim 11, wherein the first substrate comprises a nickel-copper cloth and the second substrate comprises a cloth including a plurality of carbon nanotubes.

15. An electrical energy supply device in accordance with claim 14, wherein the metal layer comprises a zinc film that is electroplated into the nickel-copper cloth.

16. An electrical energy supply device in accordance with claim 11, wherein the cathode material layer comprises alpha phase manganese dioxide nanorods synthesized in situ among the carbon nanotubes of the second substrate.

17. An electrical energy supply device in accordance with claim 11, wherein the electrolyte further comprises 2 mol $L^{-1}$ zinc sulphate and 0.1 mol $L^{-1}$ manganese sulphate.

18. An electrical energy supply device in accordance with claim 12, wherein the ethylene glycol anionic polyurethane acrylate crosslink the polyacrylamide.

19. An electrical energy supply device in accordance with claim 12, wherein the electrolyte comprises at least 20% weight percentage of ethylene glycol polyurethane acrylate.

20. An electrical energy supply device in accordance with claim 12, wherein the electrolyte comprises at least 24% weight percentage of ethylene glycol polyurethane acrylate within the electrolyte.

21. An electrical energy supply device in accordance with claim 12, wherein the electrical energy supply device maintains at least 80% specific capacity with Coulombic efficiency is greater than 90% at temperatures below 0° C.

22. An electrical energy supply device in accordance with claim 1, wherein the anode, cathode and electrolyte are formed as a multi-layer laminate structure.

23. An electrical energy supply device in accordance with claim 3, wherein the anode, cathode and electrolyte are formed as a multi-layer laminate structure.

24. An electrical energy supply device in accordance with claim 5, wherein the anode, cathode and electrolyte are formed as a multi-layer laminate structure.

25. An electrical energy supply device in accordance with claim 9, wherein the anode, cathode and electrolyte are formed as a multi-layer laminate structure.

26. An electrical energy supply device in accordance with claim 9, wherein the electrical energy supply device is configured to operate at temperatures between 0° C. to −20° C. without deterioration in electrical properties or electrical performance.

27. An electrical energy supply device in accordance with claim 9, wherein the electrical energy supply device is configured to operate at temperatures between −10° C. to −20° C. without deterioration in electrical properties or electrical performance.

28. An electrical energy supply device in accordance with claim 3, wherein the electrical energy supply device maintains mechanical properties at temperatures between 0° C. to −20° C.

29. An electrical energy supply device in accordance with claim 28, wherein the electrical energy storage device maintains its elasticity at temperatures between 0° C. to −20° C., such that the electrical energy storage device can elastically deform.

30. An electrical energy supply device in accordance with claim 29, wherein the electrical energy storage device is configured to deform in response to a force and recover to an original configuration once the force is removed, at temperatures between 0° C. to −20° C.

31. An electrical energy supply device in accordance with claim 1, wherein the anode comprises zinc or a zinc compound.

32. An electrical energy supply device in accordance with claim 3, wherein the anode comprises zinc or a zinc compound.

33. An electrical energy supply device in accordance with claim 5, wherein the anode comprises zinc or a zinc compound.

34. An electrical energy supply device in accordance with claim 9, wherein the anode comprises zinc or a zinc compound.

35. An electrical energy supply device in accordance with claim 31, wherein the anode comprises zinc film disposed on a nickel or copper or nickel-copper alloy cloth.

* * * * *